United States Patent
Yu et al.

(10) Patent No.: US 6,593,775 B2
(45) Date of Patent: Jul. 15, 2003

(54) INSULATIOR FOR A MULTI-POWER SYSTEM

(75) Inventors: Kou-Hwa Yu, Kaohsiung Hsien (TW);
Jui-Chiang Wang, Taipei (TW);
Yung-Chow Peng, Hsinchu (TW)

(73) Assignee: Winbond Electronics Corp., Hsinchu (TW)

(*) Notice: Subject to any disclaimer, the term of this patent is extended or adjusted under 35 U.S.C. 154(b) by 88 days.

(21) Appl. No.: 09/761,930

(22) Filed: Jan. 17, 2001

(65) Prior Publication Data
US 2002/0033703 A1 Mar. 21, 2002

(30) Foreign Application Priority Data
Sep. 15, 2000 (TW) .......................................... 89118896

(51) Int. Cl.$^7$ ............................................. H03K 19/185
(52) U.S. Cl. ............................. 326/80; 376/81; 376/68; 376/62; 376/63
(58) Field of Search .............................. 326/63, 62, 68, 326/75, 80, 81

(56) References Cited

U.S. PATENT DOCUMENTS

| | | | | |
|---|---|---|---|---|
| 5,101,119 A | * | 3/1992 | Yoshimori et al. | 307/296.5 |
| 5,610,544 A | * | 3/1997 | Aoki | 327/198 |
| 5,828,231 A | * | 10/1998 | Bazargan | 326/81 |

* cited by examiner

*Primary Examiner*—Michael Tokar
*Assistant Examiner*—Anh Q. Tran
(74) *Attorney, Agent, or Firm*—Ladas & Parry

(57) ABSTRACT

This invention relates to an insulator for a multi-power system, which is used to resolve the current leakage which comes from each power supplied to the corresponding devices which are not being correctly operated. The isolating device includes: a first power supply for providing an operating power to the isolating device; a level detector for detecting the voltage level of the operating power; a signal isolation controller for changing the output level of the circuit supplied by the operating power based on the operating power detected; and a second power for supplying a real-time power to circuit for power saving operation based on the changed output level.

22 Claims, 3 Drawing Sheets

INSULATIOR FOR A MULTI-POWER SYSTEM

BACKGROUND OF THE INVENTION

1. Field of the Invention

This invention relates to an insulator for a multi-power system, which is used to resolve the current leakage that comes from the power supplied to the corresponding devices which are not being operated.

2. Description of the Related Art

In a personal computer system, a common device is the power management unit. The system can have different power consumption with differently operating modes by using the power management unit. The differently operating modes, referring to FIG. 1, includes an operating power mode (referred to as a VCC mode hereinafter) for a circuit 11, such as a main circuit, a standby power mode (referred to as a VSB mode hereinafter), and a battery mode (referred to as a VBAT mode hereinafter). A standby power or a battery is applied when the system is not operated. In other words, the system enters into a VSB mode or a VBAT mode based on the selection of a selector 12. The selected mode is referred to as a real-time voltage (VRTC) mode to power a circuit 13, such as a power control circuit. At this point, if the power consumption on a standard power or a battery is minimized, we can effectively increase the system power utilization without the influence on a normal operation with the operating power in the system. However, when a PC is connected with its peripheral devices, a voltage leakage occurs from the peripherals to the VCC power supply on the PC board if the power applied to the peripherals is not reduced after the power is supplied to the PC. The voltage leakage is about 0–1.5V. Even though the value of the voltage leakage is small, the value will cause different input signal levels between the power VCC and the power VSB or VBAT. That is, the standby circuit powered by the power VSB or VBAT may receive an unknown voltage state, so as to make a correct response impossible. Therefore, a current leakage happens in this situation.

Referring to FIG. 2, a shifter is shown in U.S. Pat. No. 5,223,751. In FIG. 2, Vc and Vr are two power supply levels with about 3V and about 5V respectively, PIN is an input signal and POUT is an output signal. As shown in FIG. 2, when Vc=IN is higher than the NMOS threshold voltage but insufficient to turn the voltage level of the node B from logic high to logic low, such a shifter may have current leakage. When Vc=0V, the node B is floated. At this point, block 26 may have current leakage if the immediately previous input state of block 26 is on logic low.

Both examples as mentioned above cause the current leakage so as to waste the power resources of the system. To reduce the power consumption when not operating, a shifter or an isolating device, such as insulator, is needed for a multi-power system to reduce the current leakage, thereby increasing the efficiency of the power utilization.

SUMMARY OF THE INVENTION

Therefore, an object of the invention is to provide an isolating device, which can avoid the current leakage when power is switched to different levels, thereby effectively utilizing power resources.

To realize the above and other objects, the invention provides an isolating device. The isolating device includes: a first power supply for providing an operating power to the isolating device; a level detector for detecting the voltage level of the operating power; a signal isolation controller for changing the output level of the circuit supplied by the operating power based on the operating power detected; and a second power for supplying a real-time power to circuit for power saving operation based on the changed output level.

Accordingly, when the isolating device of the invention is provided to completely or mostly reduce the current leakage, a system with multi-power can prevent the current leakage when power is switched to different levels, so that the system can not only save the power consumption but also avoid an operating mistake in the system.

BRIEF DESCRIPTION OF THE DRAWINGS

The invention will become apparent by referring to the following detailed description of a preferred embodiment with reference to the accompanying drawings, wherein.

DETAILED DESCRIPTION OF THE INVENTION

To realize the above and other objects, the invention provides an isolating device, which is used to resolve the current leakage which comes from the power supplied to the corresponding devices which are not being correctly operated.

Figure 1:
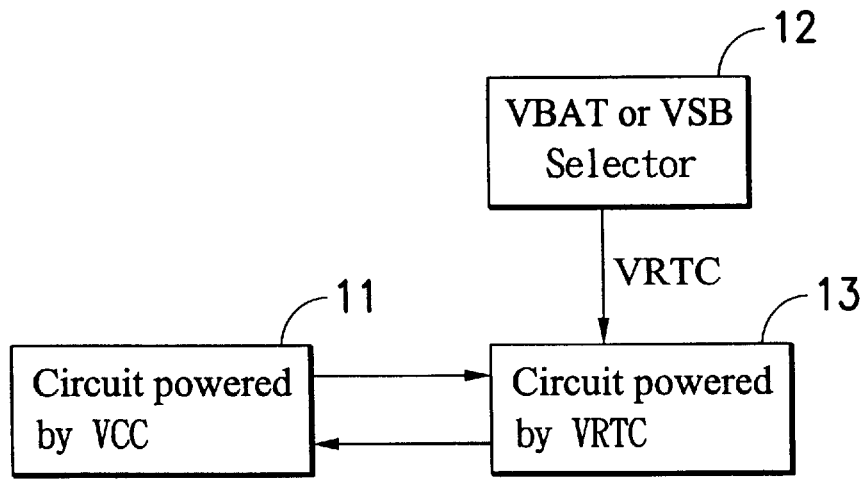
FIG. 1 is a block diagram of a conventional multi-power system.
Figure 2:
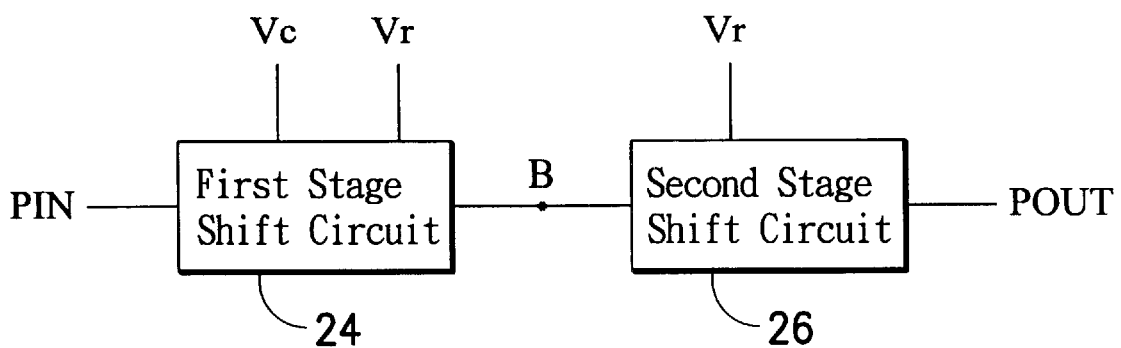
FIG. 2 is a block diagram of a conventional shifter.
Figure 3:
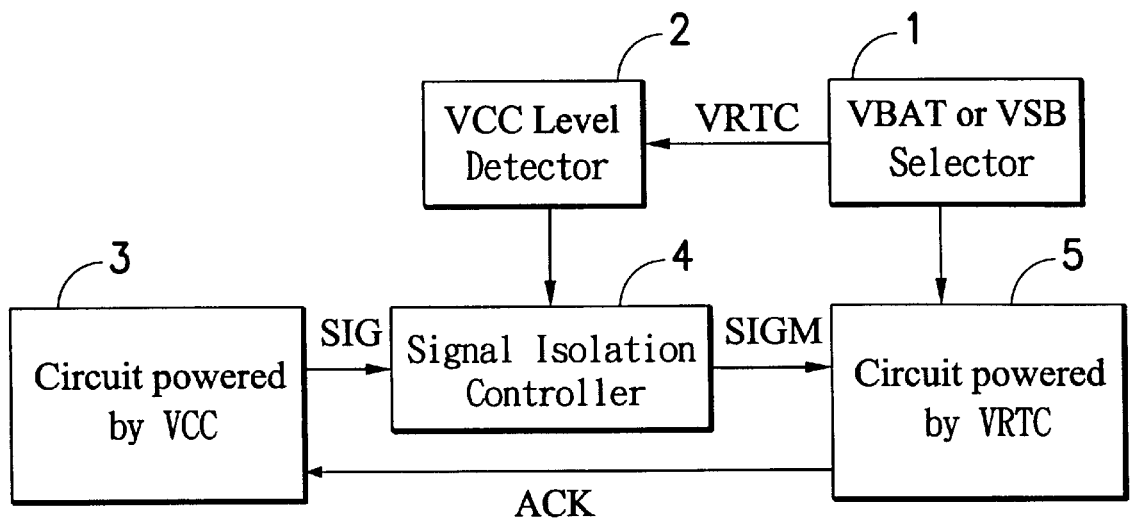
FIG. 3 is a block diagram of a multi-power system of the invention.

Refer to FIG. 3, a block diagram of a multi-power system of the invention. In FIG. 3, the multi-power system comprises: a selector 1, a level detector 2, a circuit 3 powered by VCC, a signal isolation controller 4, and a circuit 5 powered by VRTC.

As shown in FIG. 3, the selector 1 selects a power source from either a VSB or a VBAT, whichever has the higher voltage value as a VRTC power source. The selected result from the selector 1 is outputted to the level detector 2 and is outputted to the circuit 5 for powering. The level detector 2 detects an operating voltage (VCC) by comparison to the input value from the selector 1 or by comparison its split voltage to a predetermined voltage level. When the VCC value is greater than the input value, e.g. 3V, from the selector 1, the level detector 2 outputs a logic low, otherwise, it outputs a logic high. The detecting operation is described in detail below in conjunction with FIGS. 4 and 5. The logic high or low is inputted to the signal isolation controller 4 in order to adjust the voltage of an output signal SIG from a circuit 3 powered by the VCC, thereby eliminating the current leakage between the circuit 3 and the circuit 5 as happens with the prior art. This is described in detail below in conjunction with FIG. 6. The adjusted signal SIGM is inputted to the circuit 5 powered by the VRTC such that the circuit 5 accurately responds to an acknowledgement signal (ACK) to the circuit 3 powered by the VCC and performs the respective operation of the signal ACK.

Figure 4:
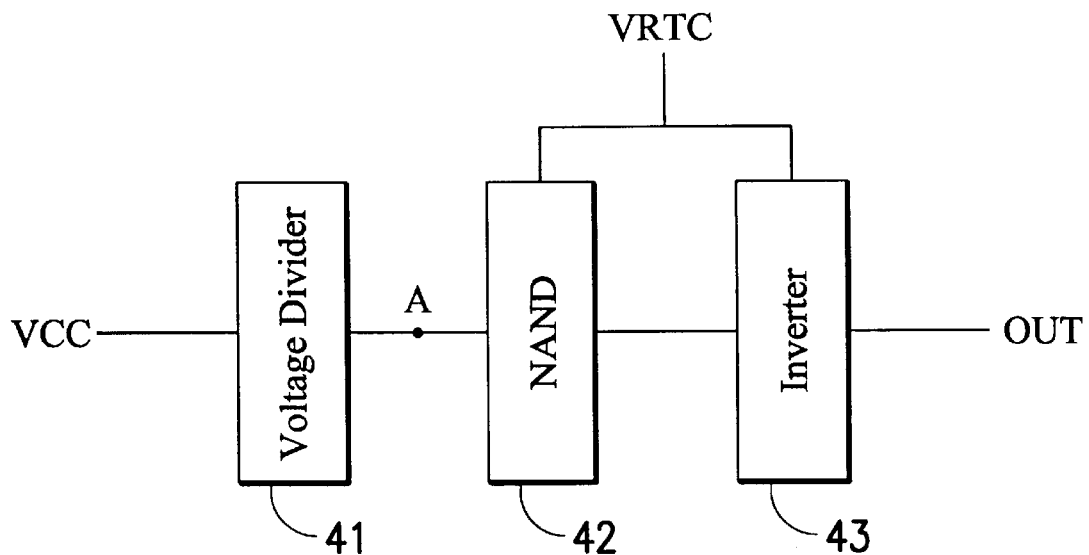
FIG. 4 is a block diagram of a level detector of the invention.

Refer to FIG. 4, a block diagram of a level detector. In FIG. 4, a voltage divider 41, a NAND gate 42, and an inverter 43 are shown. As shown in FIG. 4, a power from the selector 1 of FIG. 3 is supplied to both the NAND gate 42 and the inverter 43 as an operating power. When an input voltage VCC from an external source(not shown) is inputted to point A through the voltage divider 41, the voltage on point A interacts with the result of the VRTC power acting on the NAND gate 42 and the inverter 43. Hence, the output OUT is changed based on the resulting voltage on point A. That is, if the input voltage VCC is equal to or greater than 3V in the VBAT or VSB mode, the input voltage VCC to point A becomes a value just at the control point of the NAND 42 for the logic state transition. At this point, the output OUT=0V. Alternately, if the input voltage VCC is smaller than 3V, the OUT logic turns from low to high, i.e., OUT=1. Thus, the level detection is accomplished by detecting the logic value of the output OUT. However, this circuit easily causes a current leakage (static current) between the NAND gate 42 and the inverter 43 if the voltage of the VRTC is greater than that of the point A in the VBAT or VSB mode. Accordingly, the invention further provides another level detection circuit as follows.

Figure 5:
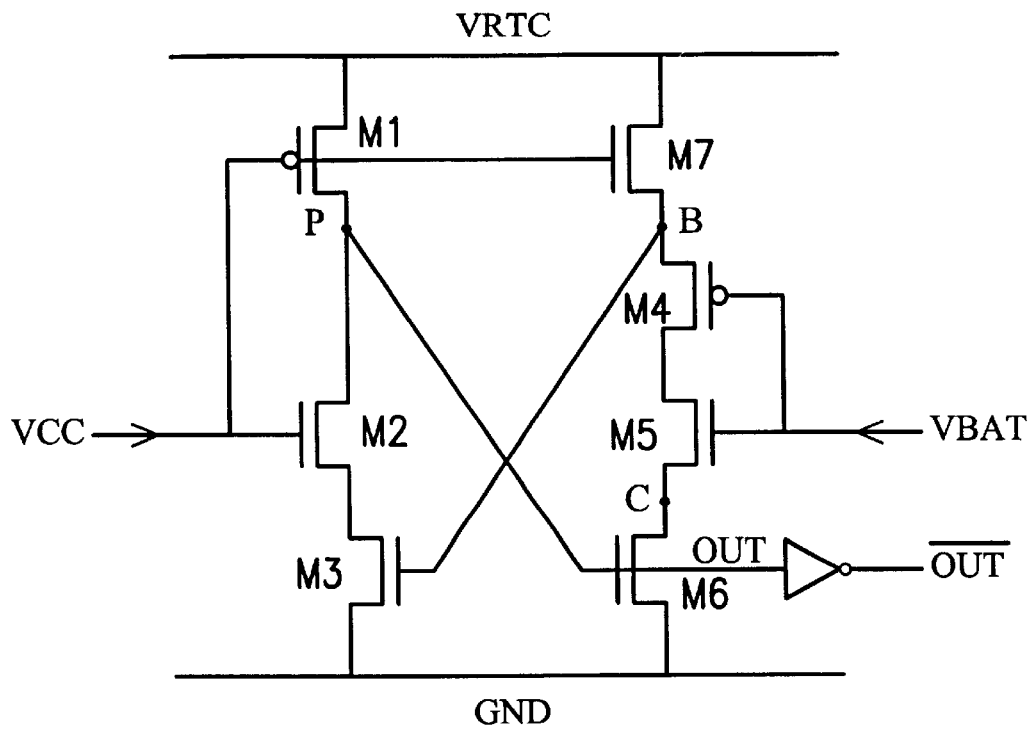
FIG. 5 is a block diagram of another level detector of the invention.

Refer to FIG. 5, another level detection circuit, which can save more power than that of the detection circuit in FIG. 4. In FIG. 5, the circuit includes: an input terminal for receiving the power VRTC of the selector 1; an input terminal for receiving the power VBAT from a battery (not shown); an input terminal from an operating power supply VCC; two PMOSs M1, M4; five NMOSs M2, M3, M5–M7; an inverter R; and outputs of a pair of complementary output signals OUT and $\overline{\text{OUT}}$.

As shown in FIG. 5, transistors M1, M2, and M3 are serially connected together in order. The channel of the transistor M1 is coupled between the input terminal of the power VRTC and the node P. The channel of the transistor M3 is coupled between transistor M2 and a grounding voltage GND. Transistors M1 and M2 are serially connected at node P to form an inverter, wherein gates of the transistors M1 and M2 are connected together to the input terminal of the power VCC. Transistors M7, M4, M5, and M6 are serially connected together in order. The channel of the transistor M7 is coupled between the input terminal of the power VRTC and a node B. The gate of the transistor M7 is connected to the gate of the transistor M1. The node B is connected to the gate of the transistor M3. Transistor M6 is coupled between a node C and the grounding voltage GND. The gate of the transistor M6 is connected to the node P and to one end of an inverter R in the opposite direction of the node P. The other end of the inverter R is connected to the output of a complementary output signal $\overline{\text{OUT}}$. Transistors M4 and M5 serially connected between the node B and C form an inverter and gates of transistors M4 and M5 are connected together to the input terminal of the power VBAT.

Refer to FIG. 5 in conjunction with the cell standard. This discloses the power level about 0–1.5V from VCC and about 1.8–2.7V from VBAT, if VCC is less than 5V. At this point, transistors M2 and M7 are closed and then transistor M3 is closed through the node B. Also, transistors M1 and M5 are turned on such that transistor M6 is turned on by the power VRTC through transistor M1 and the node P. Hence, OUT= VRTC (logic 1) is outputted while $\overline{\text{OUT}}$=0V (logic 0) after passing through the inverter P. On the other hand, when the circuit is on the VCC mode (VCC=5V), OUT=0V (logic 0) while $\overline{\text{OUT}}$=VRTC (logic 1) after passing through the inverter P. The circuit is cross-coupled as shown in figure to be a control gate so as to avoid the current leakage from the operation under VBAT or VSB mode. Hence, the efficiency of the power utilization is increased.

Figure 6:
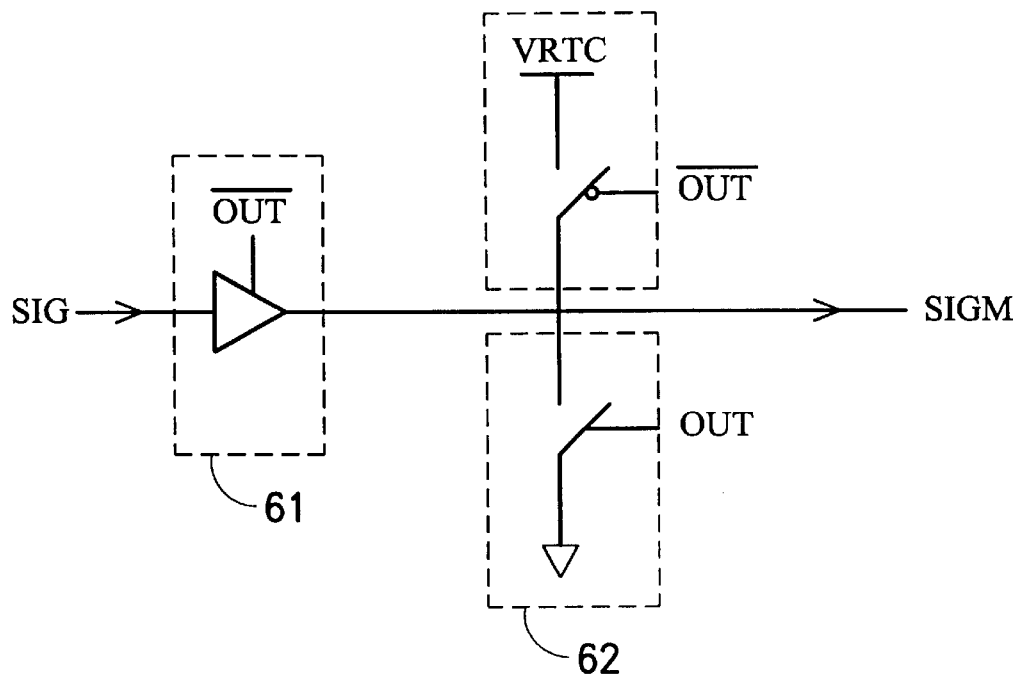
FIG. 6 is a schematic diagram of a signal isolation controller of the invention.

Refer to FIG. 6, the schematic diagram of a signal isolation controller. In FIG. 6, the circuit includes a tri-state buffer 61 and an optional switch 62. As shown in FIG. 6, a signal SIG from the circuit powered by the VCC is inputted and a function for the signal isolation control is performed by the buffer 61 and the switch 62. The signal first passes through the buffer 61 to isolate the signal by means of the switch 62 according to the input signal of the detector 2. In the switch 62, only one action of a pull-up circuit controlled by the $\overline{\text{OUT}}$ terminal or a pull-down circuit controlled by the OUT terminal exists at same time. As the signal SIG is isolated, the pull-up circuit acts if the desired output signal from the SIGM terminal is set to logic 1. On the other hand, the pull-down circuit acts if the desired output signal from the SIGM terminal is set to logic 0. This makes no current leakage happen because such a circuit is operated in the region of all operating voltage to be set. Thus, the circuit is optionally adjustable in the input to the signal logic level of the circuit powered by the VRTC. The tri-state buffer 61 can also be replaced by a transmission gate. Additionally, the signal isolation controller also acts as a latch to latch the newest logic value of the input SIG in order to restore the previous state.

Although the invention has been described in its preferred embodiment, it is not intended to limit the invention to the precise embodiment disclosed herein. Those who are skilled in this technology can still make various alterations and modifications without departing from the scope and spirit of this invention. Therefore, the scope of the invention shall be defined and protected by the following claims and their equivalents.

What is claimed is:

1. An isolating device for a multi-power system, comprising:
    a first power supply for providing an operating power to the isolating device;
    a level detector for detecting the voltage level of the operating power;
    a signal isolation controller for changing an output level of the circuit supplied by the operating power based on the operating power detected; and
    a second power for supplying a real-time power to circuit for power saving operation based on the changed output level;
    wherein the level detector further comprises:
        a voltage divider for producing a split voltage from an input voltage;
        a NAND gate for producing a logic output by comparing the split voltage level to a predetermined voltage level; and
        an inverter for controlling the output signal of the signal isolation controller by inverting the logic output.

2. The isolating device of claim 1, wherein the input voltage is provided by the operating power.

3. The isolating device of claim 1, further comprising a real-time power voltage supplied to the operation of the NAND gate and the inverter.

4. The isolating device of claim 3, wherein the real-time power voltage is provided by the selector.

5. The isolating device of claim 1, wherein the predetermined voltage level is the transition level of the NAND gate.

6. The isolating device of claim 1, wherein the level detector further comprises:
    a first NMOS transistor, having a source, a gate, and a drain connected to the ground;
    a first inverter, coupled between a real-time power provided by the selector and a NMOS transistor, including a PMOS having a source, a gate and a drain, and a NMOS having a source, a gate and a drain, wherein the NMOS and PMOS are serially connected together to form an input terminal connected to the operating power, and the drain of the PMOS and the source of the NMOS are coupled to form an output terminal for outputting the output signal of the first inverter;
    a second NMOS transistor, having a drain, a gate connected to the gate of the PMOS of the first inverter, and a source connected to an input power from the selector;

a third NMOS transistor, having a source, a gate connected to the output terminal of the first inverter, and a drain connected to the ground;

a second inverter, coupled between the second NMOS transistor and the third NMOS transistor, including a PMOS having a source, a gate, and a drain, and a NMOS having a source, a gate, and a drain, wherein the NMOS and PMOS are serially connected together to form an input terminal connected to the battery power, and the intersection point of the source of the PMOS and the drain of the second NMOS is connected to the gate of the first NMOS transistor; and a third inverter, having an input terminal connected to the gate of the third NMOS transistor, and an output terminal to output the complementary signal of the input terminal.

7. The isolating device of Claim 1, wherein the signal isolation controller further comprises:

a signal isolation component for isolating an input signal of the circuit supplied by the operating power; and a control component for adjusting the output level of the input signal according to the output signal of the level detector.

8. The isolating device of claim 7, wherein the control component comprises a latch.

9. The isolating device of claim 7, wherein the isolation component is a transmission gate.

10. The isolating device of claim 7, wherein the isolation component is a tri-state buffer.

11. An isolating device for a multi-power system, comprising:

a multi-power supply for supplying an operating power, a standby power, and a battery power;

a selector for selecting the standby power or the battery power as a real-time power;

a level detector for detecting a voltage level of the operating power according to the selected result of the selector;

a signal isolation controller for determining whether or not a logic level of the circuit supplied by the operating power is changed according to the detected voltage level of the operating power; and a circuit powered by the real-time power for issuing an acknowledgement signal to the circuit supplied by the operating power according to the determined logic level and performing the respective operation of the acknowledgement signal.

12. The isolating device of claim 11, wherein the level detector further comprises:

a voltage divider for producing a split voltage from an input voltage;

a NAND gate for producing a logic output by comparing the split voltage level to a predetermined voltage level;

an inverter for controlling the output signal of the signal isolation controller by inverting the logic output.

13. The isolating device of claim 12, wherein the input voltage is provided by the operating power.

14. The isolating device of claim 12, further comprising a real-time power voltage supplied to the operation of the NAND gate and the inverter.

15. The isolating device of claim 14, wherein the real-time power voltage is provided by the selector.

16. The isolating device of claim 12, wherein the predetermined voltage level is the transition level of the NAND gate.

17. The isolating device of claim 11, wherein the level detector further comprises:

a first NMOS transistor, having a source, a gate, and a drain connected to the ground;

a first inverter, coupled between a real-time power provided by the selector and a NMOS transistor, including a PMOS having a source, a gate and a drain, and a NMOS having a source, a gate and a drain, wherein the NMOS and PMOS are serially connected together to form an input terminal connected to the operating power, and the drain of the PMOS and the source of the NMOS are coupled to form an output terminal for outputting the output signal of the first inverter;

a second NMOS transistor, having a drain, a gate connected to the gate of the PMOS of the first inverter, and a source connected to an input power from the selector;

a third NMOS transistor, having a source, a gate connected to the output terminal of the first inverter, and a drain connected to the ground;

a second inverter, coupled between the second NMOS transistor and the third NMOS transistor, including a PMOS having a source, a gate, and a drain, and a NMOS having a source, a gate, and a drain, wherein the NMOS and PMOS are serially connected together to form an input terminal connected to the battery power, and the intersection point of the source of the PMOS and the drain of the second NMOS connected to the gate of the first NMOS transistor; and a third inverter, having an input terminal connected to the gate of the third NMOS transistor, and an output terminal to output the complementary signal of the input terminal.

18. The isolating device of claim 11, wherein the signal isolation controller further comprises:

a signal isolation component for isolating the input signal; and a control component for adjusting the output level of the input signal according to the output signal of the level detector.

19. The isolating device of claim 18, wherein the control component comprises a latch.

20. The isolating device of claim 18, wherein the isolation component is a transmission gate.

21. The isolating device of claim 18, wherein the isolation component is a tri-state buffer.

22. An isolating device for a multi-power system, comprising:

a first power supply for providing an operating power to the isolating device;

a voltage divider for producing a split voltage from an input voltage with respect to the operating power;

a NAND gate for producing a logic output by comparing the split voltage level to a predetermined voltage level;

an inverter for inverting the logic output;

a signal isolation controller for changing an output signal level of the circuit supplied by the operating power under the control of the logic output inverted; and a second power for supplying a real-time power to circuit for power saving operation based on the output signal level changed by the signal isolation controller.

* * * * *